United States Patent [19]
Smith

[11] 3,831,689
[45] Aug. 27, 1974

[54] VEHICULAR ROAD SWEEP DEVICE

[76] Inventor: Charles H. Smith, 5215 Southall Ln., Bell, Calif. 90201

[22] Filed: May 7, 1973

[21] Appl. No.: 357,940

[52] U.S. Cl.............. 180/1 R, 15/98, 37/42 VL, 172/276, 280/150 R
[51] Int. Cl............................................ E01h 10/00
[58] Field of Search........ 180/1 R; 280/150 R; 15/4, 15/93 R, 98; 37/42 VL; 172/276

[56] References Cited
UNITED STATES PATENTS

| | | | |
|---|---|---|---|
| 1,805,933 | 5/1931 | Victor | 37/42 VL |
| 2,623,310 | 12/1952 | Raught | 172/276 |
| 3,062,327 | 11/1962 | Debus | 180/1 R |
| 3,415,537 | 12/1968 | Goggins | 180/1 R |
| 3,544,370 | 12/1970 | Wrede | 280/150 R |

Primary Examiner—Robert B. Reeves
Assistant Examiner—Thomas E. Kocovsky
Attorney, Agent, or Firm—Donald Diamond

[57] ABSTRACT

A vehicular road sweep device is provided for effectively engaging a wet, slippery road surface under rapid braking, emergency-type conditions to sweep water and other debris from the path of the vehicle's tires and thereby improve traction between the vehicle and the road surface. The device, comprising right and left-hand units, is adapted to be mounted to the vehicle anterior to each of the wheels and to be operated by a manual switch or a brake system switch. The device includes a linear assembly provided with a drive member having an upwardly extending guide member and downwardly extending coupling member. A longitudinally disposed connector rod is rotatably secured to the coupling member. A road engaging assembly is attached to the lower end portion of the connector rod. The road engaging assembly includes horizontally supported, limitedly rotatable, rotary means having pivot means and a road engaging member secured thereto. Means are provided for limitedly, axially and reciprocally rotating the connector rod; and means, responsive to switch means, are provided for sequentially moving the drive member in downward and upward directions between predetermined upper and lower vertical positioning limits whereby the road engaging member is reciprocated between a raised, horizontal, inward, storage position and a lowered, vertical, outward, operative position.

7 Claims, 8 Drawing Figures

PATENTED AUG 27 1974

VEHICULAR ROAD SWEEP DEVICE

BACKGROUND OF THE INVENTION

1. Field of the Invention

This invention relates to vehicular braking and, more particularly, to a vehicular road sweep system which is mountable to a vehicle anterior to the tires and adapted to engage the road surface to sweep water away from the path of the tires and thereby improve tire traction while braking under inclement conditions.

Rapid and forceful braking of an automobile under emergency conditions on a wet pavement may cause uncontrolled sliding and skidding of the automobile as a result of reduced traction between the tires and the wet pavement. It is apparent, of course, that this situation presents a serious hazard to the motorist. Thus, it is highly desirable to provide an auxiliary system for an automobile which can be automatically or manually employed to sweep water and debris from the path of the tires of an automobile in order to enhance and improve the traction between the tires and the wet pavement.

2. Description of the Prior Art

The problem of providing a simple and economical anti-skid and anti-slippage device for automotive vehicles has been a long continuing one and a number of such devices have been developed in an effort to meet this problem. See, for example, U.S. Pat. No. 2,871,986 (Polovitch, 1959); U.S. Pat. No. 2,885,030 (Aikman, 1959); U.S. Pat. No. 2,886,139 (Wilson, 1959); U.S. Pat. No. 2,937,719 (Aikman, 1960); U.S. Pat. No. 3,042,150 (Lukawsky, 1962); U.S. Pat. No. 3,043,402 (Stephenson, 1962); U.S. Pat. No. 3,119,465 (Jervis, 1964); U.S. Pat. No. 3,142,359 (Veyret, 1964); and U.S. Pat. No. 3,415,537 (Goggins, 1968).

OBJECTS

An object of this invention is to provide a road sweep system adapted to be mounted anterior to the wheels of an automotive vehicle for effectively engaging a wet, slippery road surface, under rapid-braking, emergency-type conditions, to displace water from the path of the tires of the vehicle and thereby improve traction between the vehicle and the road surface.

Another object of this invention is to provide a vehicular road sweep device which functions in conjunction with and in response to the operation of the regular brake pedal of the vehicular braking system.

A further object of this invention is to provide a vehicular road sweep device which can be reciprocated between a raised, inoperative, storage position and a lowered, operative, road engaging position.

A still further object of this invention is to provide a vehicular road sweep device having a road engaging member which can be reciprocated between a raised, inoperative, horizontal, inwardly directed, storage position and a lowered, operative, vertical, outwardly directed, road engaging position.

A still further object of this invention is to provide a vehicular road sweep device of the character described having rotational limit means for permitting and limiting rotational movement of the road engaging member when such is in the lowered, operative, road engaging position.

SUMMARY OF THE INVENTION

In accordance with this invention, there is provided a vehicular road sweep system comprising road sweep devices adapted to be mounted to a vehicle anterior to the wheels. Each device includes a frame structure having a pair of oppositely disposed side walls and top and bottom walls provided with vertically aligned openings. A linear assembly is vertically disposed within the frame structure. The linear assembly includes a drive member having a downwardly extending coupling member and an upwardly projecting guide member which extends through and beyond the opening in the top wall of the frame structure. A longitudinally disposed connector rod is rotatably secured to the coupling member and extends through and beyond the opening in the bottom wall of the frame structure.

A road engaging assembly is attached to the lower end portion of the connector rod. The road engaging assembly includes rotary means and cooperating linking means for rotatably and horizontally securing the rotary means to the lower end portion of the connector rod. This assembly also includes a road engaging member having first and second oppositely disposed ends with the first end being secured to the rotary means and the second end being provided with a road engaging surface. Means are provided for pivoting the road engaging member from a vertical, operative position to a horizontal, inoperative, storage position and for permitting the reciprocal movement of this member; and means are provided for permitting and limiting forward and rearward movement of the road engaging member in order to accommodate obstacles on the road when this member is in the vertical, operative position.

Means, responsive to road sweep switch means, are provided for moving the drive member of the linear assembly in upward and downward directions between predetermined upper and lower vertical positioning limits. Means are also provided for limitedly, axially and reciprocally rotating the connector rod during the downward and upward movement of the linear assembly whereby the road engaging member is rotated between an inward storage position and an outward operative position.

The road engaging member is ordinarily maintained in a raised, horizontal, storage position angularly disposed away from the adjacent wheel. When the road sweep switch is placed in the operative position, the linear assembly and connector rod are moved downwardly until a predetermined position is reached. Simultaneously the road engaging member pivots from the raised, horizontal, storage position to the vertical, operative position and the connector rod rotates so as to place the road engaging member anterior to the front wheel and diagonally outwardly with respect to the horizontal axis of the wheel. Thus, the road engaging surface of the road engaging member is brought into contact with the wet road to sweep water and debris from the path of the vehicle tire and thereby improve traction between the vehicle tire and the road surface. When the road sweep switch is placed in the storage position, the aforesaid movements are reversed and the road engaging member is returned to its storage position.

DETAILED DESCRIPTION

Figure 1:
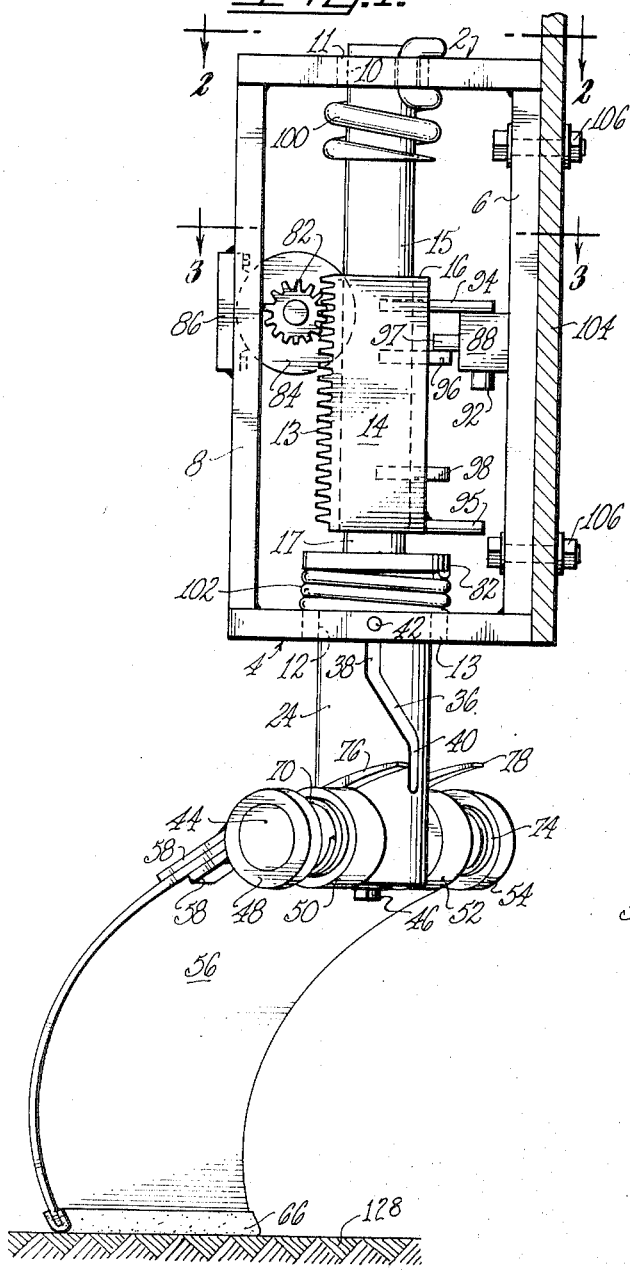
FIG. 1 is a side elevation of the road sweep device in the extended, road engaging position.
Figure 2:
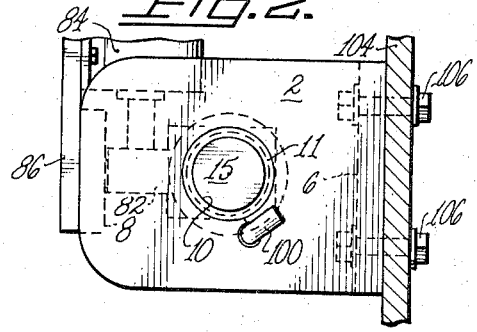
FIG. 2 is a transverse section along line 2—2 of FIG. 1.

Referring now to the drawings and, in particular, to FIG. 1, there is shown a vehicular road sweep device comprising a frame structure having a top wall 2, a bottom wall 4 and oppositely disposed side walls 6, 8. The top wall has an opening 10 provided with a bushing 11 and is in vertical alignment with an opening 12 in the bottom wall which is also provided with a bushing 19.

A linear assembly is vertically disposed within the frame structure. The linear assembly includes a drive member in the form of a linear gear 13 vertically affixed to a rectangularly shaped gear support 14. A cylindrical guide member 15 projects upwardly from the gear support and extends through and beyond the opening 10 in the top wall of the frame structure. The cross-sectional area of the guide member is less than that of the gear support to provide a gear support shoulder portion 16. A coupling member 17 extends downwardly from the lower end of the gear support. The upper end of the coupling member is threadedly connected to the lower end of the gear support. The lower end of the coupling member terminates in a laterally extending shoulder 18 which is provided with a race 20 in its upper surface for rotatably supporting a plurality of bearings 22.

Figure 4:
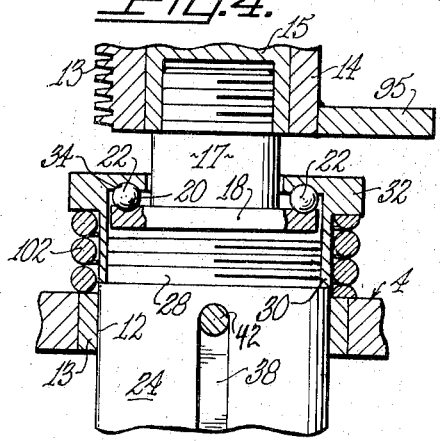
FIG. 4 is a fragmentary, longitudinal section showing the connector rod and cap rotatably secured to the coupling member of the linear assembly.

A connector rod and cap assembly 24, 30, as shown in FIG. 4, is rotatably secured to the laterally extending shoulder 18 of the coupling member with the connector rod 24 extending downwardly through and beyond the opening 12 in the bottom wall of the frame structure. The connector rod has a transverse opening at its lower end and terminates at its upper end in an externally threaded neck portion 28. A hollow, internally threaded connector rod cap 30, terminating in a T-shaped flange 32 at its upper end, is threadedly attached to the neck of the connector rod. The underside of the inwardly extending portion of the flange is provided with a race 34 for rotatably engaging the bearings 22 disposed within and supported by the race 20 in the upper surface of the shoulder 18 of the coupling member.

The connector rod is provided with a diagonally disposed channel portion 36 in its outer surface. This channel portion is confluent at its upper end with an upwardly and vertically extending channel portion 38 and is confluent at its lower end with a downwardly and vertically extending channel portion 40. A guide pin 42 is laterally attached to the sidewall of the opening 12 in the bottom wall 4 of the frame structure. This pin engages the channel of the connector rod such that vertical movement of the drive member, as hereinafter described, results in pre-determined horizontal rotation of the connector rod.

A support rod 44 extends horizontally through the transverse opening in the lower end of the connector rod and is secured to the connector rod by means of a suitable fastener 46. A plurality of hollow cylinders are rotatably mounted on the support rod. Four hollow cylinders 48, 50, 52 and 54 are shown in the drawings, with two cylinders being disposed about the support rod on each side of the connector rod.

Figure 3:
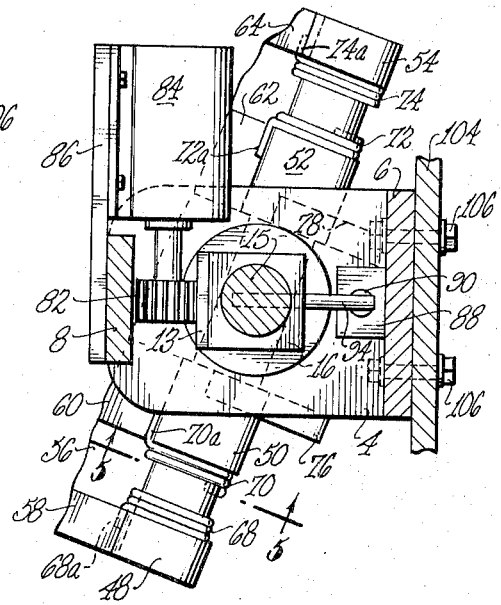
FIG. 3 is a transverse section along line 3—3 of FIG. 1.

The upper end of a bow-shaped road engaging member 56 is attached to the outer surface of the hollow cylinders by suitable attachment means which may take the form of spaced connector members 58, 60, 62 and 64 secured to the cylinders in linear alignment and fastened to the upper end of the road engaging member. The lower end of the road engaging member is provided with a road engaging surface as, for example, a U-shaped hard rubber member 66 which is attached thereto by rivets or other appropriate fasteners. Rotational movement of the road engaging member in the forward and rearward directions is provided for and limited by rotational limit springs 68, 70, 72 and 74 attached to the support rod and associated with the spaced members connecting the upper end of the road engaging member to the rotatable cylinders. Adjacent springs, as shown in FIG. 3, are oppositely disposed and the laterally extending outer ends thereof 68a, 70a, 72a and 74a alternately engage the lower and upper surfaces of the spaced connector members.

Rotational levers are attached to the rotatable cylinders for rotating the road engaging member from its vertical, operative position to its horizontal, inoperative, storage position. Rotational movement is effected by the rotational levers slidably and rotatably engaging the underside of the bottom wall of the frame structure. In a preferred form, a first rotational lever 76 is attached to the rotatable cylinder 50 adjacent to the left-hand side of the connector rod and a second rotational lever 78 is attached to the rotatable cylinder 52 adjacent to the right-hand side of the connector rod.

The linear gear 13, which is affixed to the gear support 14, is vertically reciprocated by engagement with a spur gear 82 operated by a reversible motor 84 attached to a mounting bracket 86 which is fastened to the side wall 8 of the frame structure. A solenoid 88 is attached to the opposite side wall 6 of the frame structure at a locus which is advantageously in alignment with the spur gear. The solenoid is provided with a top switch 90 on its top wall and a bottom switch 92 on its bottom wall. A first switch actuator 94 is attached to the gear support adjacent to its upper end for engaging the solenoid top switch and a second switch actuator 95 is attached to the gear support adjacent to its lower end for engaging the solenoid bottom switch. There is also attached to the gear support first and second solenoid tongue engaging members. The first solenoid tongue engaging member 96 is attached to the gear support near its upper end and is adapted to engage the lower surface of the extended solenoid tongue 97 when the solenoid top switch is actuated. The second solenoid tongue engaging member 98 is attached to the gear support near its lower end and is adapted to engage the upper surface of the extended solenoid tongue when the solenoid bottom switch is actuated.

A first, compressible, expansion spring 100 for biasing the gear support downwardly is disposed about the upwardly extending guide member 15 with one end of the spring engaging the top wall 2 and the other end of the spring engaging the upper shoulder 16 of the gear support. A second, compressible, expansion spring 102 for biasing the linear assembly in an upward direction is disposed about the connector rod cap 30 with one end of the spring engaging the outwardly extending portion of the cap flange 32 and the other end of the spring engaging the bottom wall 4 of the frame structure.

The road sweep device is mounted to the vehicle by attaching the side wall 6 of the frame structure to the vehicle frame 104 anterior to the wheel with appropriate fasteners 106. In practice, right and left-hand units are mounted to the vehicle anterior to the front and back wheels and they are simultaneously activated by appropriate electrical circuitry controlled by manual or brake system switch means.

The vehicle is provided with a road sweep device actuator switch 108 which functions in conjunction with the operation of the brake pedal. This switch may advantageously include pressure sensing means such that a predetermined minimum pressure applied to the brake pedal will be required in order to actuate the switch. In addition, the brake pedal actuated switch may advantageously include selectively operable means such that the switch may be selectively set to be operable or inoperable upon the application of force to the brake pedal.

Figure 6:
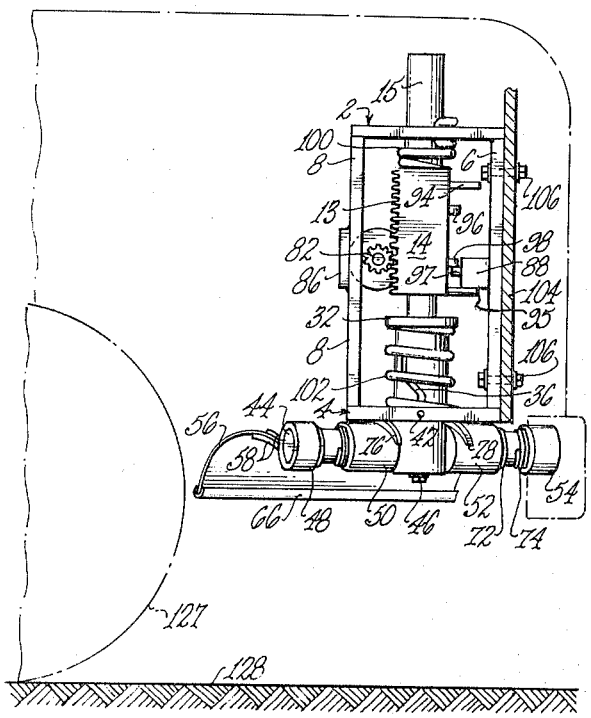
FIG. 6 is a side elevation of the road sweep device in the raised, inoperative, storage position.
Figure 7:
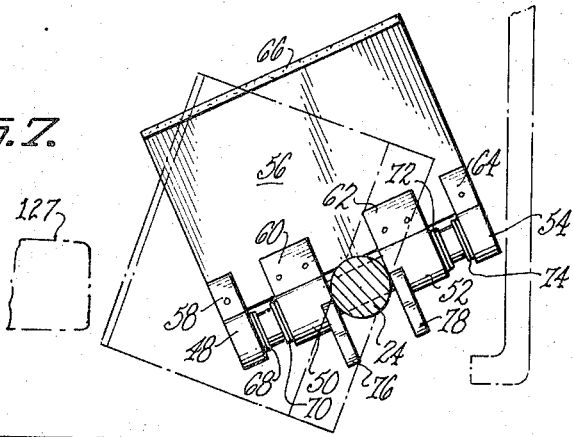
FIG. 7 shows, in solid lines, the horizontal alignment of the road sweep device when it is in the raised, storage position and shows, in dashed lines, the horizontal alignment of the device when it is in the lowered, operative position.

The road sweep device is normally maintained in the raised, inoperative position with the road engaging member being horizontally disposed and angled inwardly away from the front wheel as shown in FIG. 6. When the device is in the raised position, the second solenoid tongue engaging member 98 engages the upper surface of the extended solenoid tongue 97, the spur gear 82 engages the lower end of the linear gear 13, the first expansion spring 100 is compressed and the second expansion spring 102 is in the expanded position.

Figure 8:
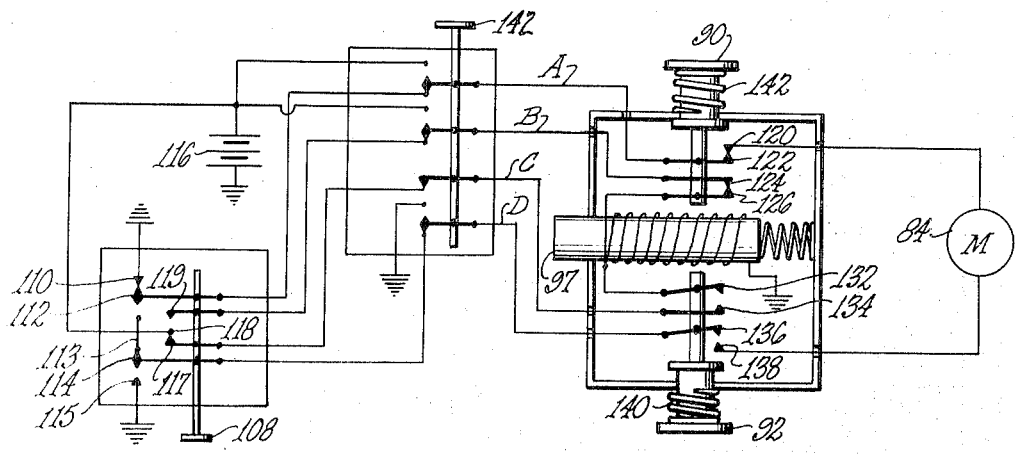
FIG. 8 is a schematic illustration of the electrical circuit for energizing the motorized gear and the solenoid switch.

Referring now to FIG. 8, when the device is in the raised, inoperative position, the solenoid top switch 90 is biased outwardly by means of a first switch expansion spring 142 and contacts 120 and 122 are closed and contacts 124 and 126 are also closed. Solenoid bottom switch 92 is in engagement with the second switch actuator 95 and is biased inwardly against a second switch expansion spring 140 and contacts 136 and 138 are open and contacts 132 and 134 are also open. The positions of the contacts of the brake system actuated switch 108 are as follows: contacts 117 and 118 are closed; contacts 118 and 119 are open; contacts 110 and 112 are closed; contacts 112 and 113 are open; contacts 113 and 114 are closed; and contacts 114 and 115 are open.

When the brake system switch 108 is activated to the operative position, contacts 117 and 118 open and contacts 118 and 119 close. This sequence permits current to flow along current path B and energize the solenoid 88 whereby the solenoid tongue 97 is withdrawn from engagement with the second solenoid tongue engaging member 98. The first expansion spring 100 biases the gear support 14 downwardly disengaging the second switch actuator 95 from the solenoid bottom switch 92. The spring actuated solenoid bottom switch is biased outwardly closing contacts 132 and 134 and closing contacts 136 and 138. The actuation of the brake system switch also opens contacts 110 and 112; opens contacts 113 and 114; closes contacts 112 and 113; and closes contacts 114 and 115. This sequence permits current to flow along current path A/D and energize the spur gear motor 84.

The energizing of the spur gear motor rotates the spur gear 82 which drives the linear gear 13 and, thus, the linear assembly, in a downward direction until the spring-biased, solenoid top switch 90 compressibly engages the first switch actuator 94 attached to the gear support. The actuation of this switch opens contacts 120 and 122 in current path A and opens contacts 124 and 126 in current path B. The opening of contacts in current path A interrupts the flow of current to the spur gear motor and this motor stops. The opening of contacts in current path B interrupts the flow of current to the solenoid resulting in the extension of the spring biased tongue 97 to engage the upper surface of the first solenoid tongue engaging member 96. The downward movement of the linear assembly results in the second expansion spring 102 being compressed.

The connector rod 24, which is rotatably connected to the linear assembly, moves in tandem with this assembly. During the downward movement of the connector rod, the levers 76, 78, which are connected to the rotatable cylinders 50, 52, disengage from the underside of the bottom wall 4 of the frame structure whereby the road engaging member 56 pivots from the horizontal position as shown in FIG. 6 to the vertical position as shown in FIG. 1. Concurrently, the connector rod cap 30 and the attached connector rod horizontally rotate on the bearing assembly 22 as a result of the diagonal channel 36 in the outer surface of the linearly moving connector rod engaging the guide pin 42 which is laterally attached to the side wall of the opening 12 in the bottom wall of the frame structure. The angle and length of the diagonal channel is such that the road engaging member is rotated outwardly so as to be anterior of and diagonally outward with respect to the vehicle's wheel 127. Thus, the foregoing movements bring the road engaging surface 66 of the road engaging member into road sweeping relationship with the top of the road 128.

Figure 5:
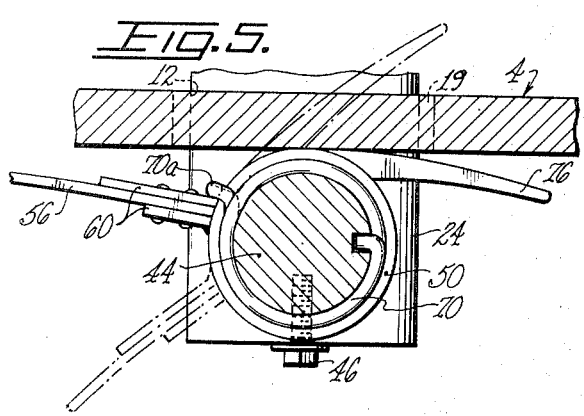
FIG. 5 is a transverse section along line 5—5 of FIG. 3, and partly in phantom, showing, schematically, the rotational movement of a cylinder lever and the corresponding movement of the road engaging member from the vertical to the horizontal position.

The road engaging member, when in the operative road engaging position, is adapted to pivot upwardly in the forward and rearward directions in order to accommodate relatively large objects without damaging the device. This pivotal action is permitted and limited by utilizing rotational limit springs 68, 70, 72 and 74 in connection with the rotatable cylinders 48, 50, 52 and 54. As shown in FIG. 5, one end 130 of the limit spring is attached to the transverse rod 44 and the other end of the limit spring is provided with a laterally extending portion 70a which overlies the spaced connectors 60 for connecting the road engaging member to the rotatable cylinder. The laterally disposed ends of the springs alternately engage the upper and lower surfaces of the spaced connectors in order to provide balanced forward and rearward rotational limits.

The release of the brake pedal moves the road sweep switch 108 to the storage position which opens contacts 118 and 119 and closes contacts 117 and 118. Since contacts 132 and 134 are closed, this sequence permits current to flow along current path C and energize the solenoid 88 whereby the solenoid tongue 97 is withdrawn from engagement with the upper surface of the first solenoid tongue engaging member 96. The second expansion spring 102 biases the gear support 14 upwardly disengaging the first switch actuator 94 from the solenoid top switch 90. The spring actuated solenoid top switch is biased outwardly closing contacts 120 and 122 and closing contacts 124 and 126. The movement of the road sweep switch to the storage position also opens contacts 112 and 113; opens contacts 114 and 115; closes contacts 110 and 112; and closes contacts 113 and 114. This sequence permits current to flow along current path D/A and energize the spur gear motor 84 in the reverse direction.

The energizing of the spur gear motor rotates the spur gear which drives the linear gear 13 upwardly until the spring biased, solenoid bottom switch 92 compressibly engages the second switch actuator 95 attached to the gear support 14 adjacent to its lower end. The actuation of this solenoid switch opens contacts 132 and 134 in current path C and opens contacts 136 and 138 in current path D. The opening of the contacts in current path D stops the spur gear motor. The opening of the contacts in current path C interrupts the flow of current to the solenoid resulting in the extension of the spring biased tongue 97 to engage the lower surface of the second solenoid tongue engaging member 98. The upward movement of the linear assembly results in the first expansion spring 100 being compressed.

During the upward movement of the linear gear, the road engaging assembly is rotated inwardly as a result of the diagonal channel 36 in the outer surface of the vertically moving connector rod 24 engaging the guide pin 42 attached to the side wall of the opening in the bottom wall of the frame structure. Also, the levers 76, 78 attached to the rotatable cylinders 50, 52 slidably engage the underside of the bottom wall of the frame structure to pivot the road engaging member from the vertical to the horizontal, inoperative, storage position.

The vehicle passenger compartment may advantageously be provided with a manually operated road sweep actuator switch 142. When the manual switch is actuated to the operative position, current path A/D and current path B are energized in like manner to that hereinabove described for the brake system switch 108 and the road engaging member is lowered to an operative, outwardly directed, road engaging position. When the manual switch is moved to the storage position, current path D/A and current path C are energized in like manner to that hereinabove described for the brake system switch 108 and the road engaging member is raised to an inoperative, inwardly directed, storage position.

While in the foregoing description and accompanying drawing there has been shown and described the preferred embodiment of this invention, it will be understood, of course, that minor changes may be made in the details of construction as well as in the combination and arrangement of parts without departing from the spirit and scope of the invention as claimed.

I claim:

1. A vehicular road sweep device comprising:

a frame structure having a top wall, a bottom wall and a pair of oppositely disposed side walls, said top and bottom walls having vertically aligned openings therein, and said frame structure being adapted to be mounted to a vehicle anteriorly with respect to the wheel thereof;

a linear assembly vertically disposed in said frame structure, said linear assembly including a guide member, a drive member and a coupling member, said guide member projecting upwardly from said drive member and extending through and beyond the opening in the top wall of the frame structure, and said coupling member extending downwardly from said drive member;

a connector rod, said connector rod being rotatably secured to said coupling member and extending downwardly through and beyond the opening in the bottom wall of said frame structure;

first yieldable means for biasing the linear assembly and connector rod in a downward direction and second yieldable means for biasing the linear assembly and connector rod in an upward direction;

a road engaging assembly, said road engaging assembly including rotary means and cooperating linking means for rotatably and horizontally securing said rotary means to the lower end portion of said connector rod, a road engaging member having first and second oppositely disposed ends, said first end being connected to said rotary means and said second end being provided with a road engaging surface, means for pivoting said road engaging member from a vertical, operative position to a horizontal, inoperative, storage position and permitting the reciprocal movement of said road engaging member, and means for permitting and limiting forward and rearward arcuate movement of said road engaging member in order to accommodate obstacles on the road when said member is in the vertical, operative position;

means, responsive to switch means, for sequentially moving the drive member in downward and upward directions between predetermined upper and lower vertical positioning limits; and means for limitedly, axially and reciprocally rotating the connector rod in response to the downward and upward movement of the drive member whereby the road engaging member is reciprocally rotated between an inward storage position and an outward operative position.

2. A device according to claim 1 wherein said connector rod is provided with a transverse opening through its lower end portion, said linking means comprises a support rod horizontally disposed through said transverse opening and fastened to said connector rod and said rotary means comprises a plurality of hollow cylindrical members rotatably disposed about said support rod in substantially fixed lateral alignment.

3. A device according to claim 2 wherein the means for pivoting the road engaging member from the vertical, operative position to the horizontal, storage position comprises a plurality of levers attached to said rotatable cylindrical members for slidably and rotatably engaging the underside of the frame structure bottom wall in response to upward movement of the drive member.

4. A device according to claim 3 wherein the means for permitting and limiting forward and rearward arcuate movement of the road engaging member comprises a rotational limit spring employed in combination with each rotatable cylindrical member with adjacent springs being oppositely disposed.

5. A device according to claim 4 wherein the drive member comprises a linear gear vertically affixed to a gear support and the means for impelling said linear gear comprises an electrically actuated, motorized rotary gear.

6. A device according to claim 5 wherein the means for moving the linear gear between predetermined upper and lower limits includes switch means responsive to upper and lower gear support switch actuators for selectively opening the motorized gear electrical circuit and said switch means including a solenoid having a spring biased tongue with said tongue being adapted to releasably interlock with first and second tongue engaging members attached to said gear support when said linear gear is at its predetermined upper and lower limits, respectively.

7. A device according to claim 6 wherein the means for limitedly, axially and reciprocally rotating the connector rod comprises a guide pin attached to the frame structure which cooperatively engages a diagonal channel in the outer surface of said connector rod.

* * * * *